United States Patent
Doane et al.

(10) Patent No.: US 7,788,708 B2
(45) Date of Patent: Aug. 31, 2010

(54) SYSTEMS AND METHODS FOR DELEGATING INFORMATION TECHNOLOGY AUTHORIZATION TO AT LEAST ONE OTHER PERSON

(75) Inventors: David A. Doane, Draper, UT (US); Douglas Jock Walker, Springville, UT (US)

(73) Assignee: PresenceID, Inc., Salt Lake City, UT (US)

( * ) Notice: Subject to any disclaimer, the term of this patent is extended or adjusted under 35 U.S.C. 154(b) by 0 days.

(21) Appl. No.: 11/866,310

(22) Filed: Oct. 2, 2007

(65) Prior Publication Data

US 2008/0083021 A1  Apr. 3, 2008

Related U.S. Application Data

(60) Provisional application No. 60/827,842, filed on Oct. 2, 2006, provisional application No. 60/828,018, filed on Oct. 3, 2006.

(51) Int. Cl.
- G06F 7/04 (2006.01)
- G06F 12/14 (2006.01)
- H04L 29/06 (2006.01)
- H04L 9/32 (2006.01)
- G06F 21/00 (2006.01)
- G06F 7/00 (2006.01)

(52) U.S. Cl. .................. 726/5; 726/4; 726/6; 726/22; 713/166; 713/168; 713/182; 707/694

(58) Field of Classification Search ............... 726/4–6, 726/22; 713/166, 168, 182; 707/694
See application file for complete search history.

(56) References Cited

U.S. PATENT DOCUMENTS

| | | | |
|---|---|---|---|
| 5,499,358 A | 3/1996 | Nevarez | |
| 5,608,903 A | 3/1997 | Prasad et al. | |
| 5,742,820 A | 4/1998 | Perlman et al. | |
| 5,758,344 A | 5/1998 | Prasad et al. | |
| 5,794,232 A | 8/1998 | Mahlum et al. | |
| 5,818,936 A | 10/1998 | Mashayekhi | |
| 5,893,118 A | 4/1999 | Sonderegger | |
| 5,933,826 A | 8/1999 | Ferguson | |
| 6,105,062 A | 8/2000 | Andrews et al. | |
| 6,192,405 B1 | 2/2001 | Bunnell | |
| 6,438,594 B1 | 8/2002 | Bowman-Amuah | |
| 6,442,748 B1 | 8/2002 | Bowman-Amuah | |
| 6,446,253 B1 | 9/2002 | Mellmer | |
| 6,539,396 B1 | 3/2003 | Bowman-Amuah | |
| 6,601,234 B1 | 7/2003 | Bowman-Amuah | |
| 6,871,232 B2 | 3/2005 | Curie et al. | |
| 6,871,286 B1 * | 3/2005 | Cagle et al. | 726/5 |
| 6,981,043 B2 | 12/2005 | Botz et al. | |
| 6,993,508 B1 | 1/2006 | Major et al. | |

(Continued)

Primary Examiner—Aravind K Moorthy
(74) Attorney, Agent, or Firm—Austin Rapp & Hardman

(57) ABSTRACT

A system for delegating authorization relating to an information technology resource is described. The system includes a processor and memory in electronic communication with the processor. A user database is stored in the memory. The user database includes a plurality of user identifications and trusted circle data. Instructions are stored in the memory and are executable to add a new user to the trusted circle data and to provide a user interface for the new user so that the new user is capable of resetting a password for an account owner or of reinstating an account for the account owner.

8 Claims, 14 Drawing Sheets

U.S. PATENT DOCUMENTS

| | | |
|---|---|---|
| 7,080,077 B2 | 7/2006 | Ramamurthy et al. |
| 7,085,834 B2 | 8/2006 | Delany et al. |
| 7,099,871 B2 | 8/2006 | Faybishenko et al. |
| 7,103,676 B2 | 9/2006 | Payrits et al. |
| 7,107,610 B2 | 9/2006 | Lortz |
| 7,111,297 B1 | 9/2006 | Sankaranarayan et al. |
| 7,113,994 B1 | 9/2006 | Swift et al. |
| 7,114,037 B2 | 9/2006 | Agarwal et al. |
| 7,120,797 B2 * | 10/2006 | Wheeler .................... 713/176 |
| 7,249,261 B2 * | 7/2007 | Charbonneau ............. 713/184 |
| 2003/0018919 A1 * | 1/2003 | Arbab et al. ................ 713/202 |
| 2003/0061515 A1 * | 3/2003 | Kindberg et al. ............ 713/201 |
| 2004/0123106 A1 * | 6/2004 | D'Angelo et al. ........... 713/171 |
| 2006/0005229 A1 * | 1/2006 | Palekar et al. .................. 726/1 |
| 2006/0015937 A1 * | 1/2006 | Illowsky et al. .............. 726/18 |
| 2006/0259957 A1 * | 11/2006 | Tam et al. ...................... 726/3 |
| 2006/0271789 A1 * | 11/2006 | Satomura et al. ........... 713/183 |
| 2007/0016630 A1 * | 1/2007 | Samji et al. ................. 707/204 |
| 2007/0079116 A1 * | 4/2007 | Johnson ..................... 713/156 |

* cited by examiner

Authorizations 38

☒ Password Reset

☒ Reinstate Suspended Account

Fig. 3

SYSTEMS AND METHODS FOR DELEGATING INFORMATION TECHNOLOGY AUTHORIZATION TO AT LEAST ONE OTHER PERSON

RELATED APPLICATIONS

This application is related to and claims priority from U.S. Provisional Patent Application Ser. No. 60/827,842 filed Oct. 2, 2006, for PRESENCEID PROXY MANAGEMENT, with inventor Douglas Walker, which is incorporated herein by reference; and This application is also related to and claims priority from U.S. Provisional Patent Application Ser. No. 60/828,018 filed Oct. 3, 2006, for PRESENCEID TRUSTED CIRCLE, with inventor Douglas Walker, which is incorporated herein by reference.

TECHNICAL FIELD

The present invention relates generally to computers and computer-related technologies. More specifically, the present invention relates to systems and methods for providing computer related support.

BACKGROUND

Computer and communication technologies continue to advance at a rapid pace. Indeed, computer and communication technologies are involved in many aspects of business operations. For example, a business may be located in numerous places with computers at each location. Computers may allow a business to maintain data relating to the business operations, customers, services, etc. Employees of a business may enter the data into the computers by utilizing business applications that run on the computers. Applications may also allow the employee to manage the data after it has been entered into the computer.

Data stored in a computer or a computer system is typically organized into a file, a database, or another type of data repository. It is not uncommon for an enterprise (e.g., corporation, small business, non-profit institution, government body, etc.) to have data stored in several different types of data repositories. There may be many reasons for this. For example, an enterprise may have inherited some data repositories as a result of mergers, acquisitions or the like with other enterprises. Alternatively, different departments within the same enterprise may have different needs which are best satisfied by different types of computer systems having different types of data repositories. The different data repositories maintained by an enterprise may be located in a variety of different computer systems, which may be dispersed around an office, around a campus, or even around the world.

Given the complexities with enterprise computer systems and databases, as shown above, providing customer support for such an organization can be difficult and costly. One problem that enterprises often have to deal with in an on-line environment is the reset of passwords and suspended accounts. Industry statistics show that it is one of the largest costs associated with customer service, and also that is a security issue. Telephone support personnel are asked to "test" the caller with predetermined questions to authenticate the caller's identity. Upon authentication, telephone support personnel can manually reset a user password or reinstate a suspended user's account.

When computer customer support is needed in a business, typically at least one or more users' productivity is being impacted. In addition, the time it takes to solve the problem, as well as the actual cost of the support, can be costly to the business. As such, benefits may be realized by improved systems and methods for providing computer-related support to users in a computing environment.

BRIEF DESCRIPTION OF THE DRAWINGS

Exemplary embodiments of the invention will become more fully apparent from the following description and appended claims, taken in conjunction with the accompanying drawings. Understanding that these drawings depict only exemplary embodiments and are, therefore, not to be considered limiting of the invention's scope, the exemplary embodiments of the invention will be described with additional specificity and detail through use of the accompanying drawings in which:

FIG. 3 is a diagram of one possible configuration for a set of authorizations;

DETAILED DESCRIPTION

Figure 2:
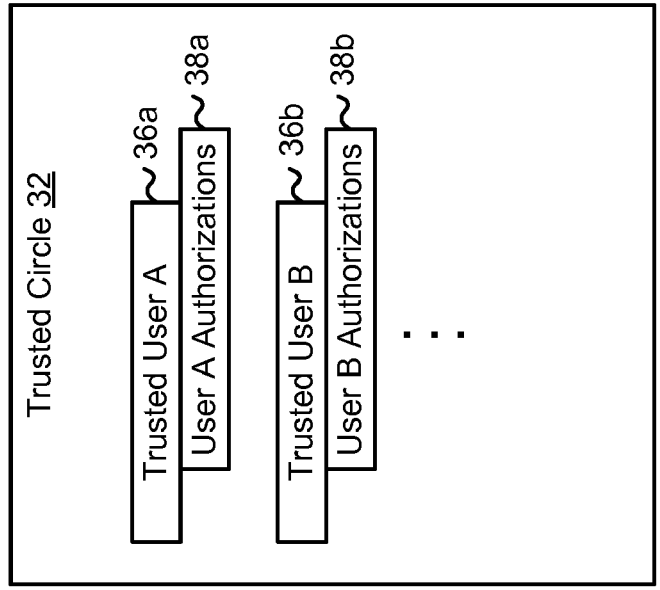
FIG. 2 is a block diagram of one possible configuration of a trusted circle for a particular user.

A system for delegating authorization relating to an information technology resource is described. The system includes a processor and memory in electronic communication with the processor. A user database is stored in the memory. The user database includes a plurality of user identifications and trusted circle data. Instructions are stored in the memory and are executable to add a new user to the trusted circle data and to provide a user interface for the new user so that the new user is capable of resetting a password for an account owner or of reinstating an account for the account owner.

A plurality of the user identifications in the user database may include a plurality of trusted circles. The trusted circle data may be the account owner's trusted circle data. The trusted circle data may include a list of trusted users. Each trusted user may have the authorization to reset a password for the account owner.

A method for delegating authorization relating to an information technology resource is also described. A plurality of user identifications are added to a user database that is stored on a computing device. The user database further includes trusted circle data. A new user is added to the trusted circle data. A user interface is provided for the new user wherein the new user is capable of resetting a password for an account owner or of reinstating an account for the account owner. The new user and the account owner are not the same user. The password for the account owner is then reset by the new user.

Various embodiments of the invention are now described with reference to the Figures, where like reference numbers indicate identical or functionally similar elements. The embodiments of the present invention, as generally described and illustrated in the Figures herein, could be arranged and designed in a wide variety of different configurations. Thus, the following more detailed description of several exemplary embodiments of the present invention, as represented in the Figures, is not intended to limit the scope of the invention, as claimed, but is merely representative of the embodiments of the invention.

The word "exemplary" is used exclusively herein to mean "serving as an example, instance, or illustration." Any embodiment described herein as "exemplary" is not necessarily to be construed as preferred or advantageous over other embodiments.

Many features of the embodiments disclosed herein may be implemented as computer software, electronic hardware, or combinations of both. To clearly illustrate this interchangeability of hardware and software, various components will be described generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

Where the described functionality is implemented as computer software, such software may include any type of computer instruction or computer executable code located within a memory device and/or transmitted as electronic signals over a system bus or network. Software that implements the functionality associated with components described herein may comprise a single instruction, or many instructions, and may be distributed over several different code segments, among different programs, and across several memory devices.

As used herein, the terms "an embodiment", "embodiment", "embodiments", "the embodiment", "the embodiments", "one or more embodiments", "some embodiments", "certain embodiments", "one embodiment", "another embodiment" and the like mean "one or more (but not necessarily all) embodiments of the disclosed invention(s)", unless expressly specified otherwise.

The term "determining" (and grammatical variants thereof) is used in an extremely broad sense. The term "determining" encompasses a wide variety of actions and therefore "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The phrase "based on" does not mean "based only on," unless expressly specified otherwise. In other words, the phrase "based on" describes both "based only on" and "based at least on."

In business there are a number of situations in which a user may want to delegate authorization to perform a task or use a resource to another co-worker, supervisor or service administrator, that is normally restricted to them and or a system administrator. For example when an employee forgets a login or password, they must call a customer support representative (CSR) who must use system administrative rights to reset a user's login/password. Another example may be when an employee knows that they will be away from the office (i.e. business trip, vacation, sick and maternity leave, sabbatical, etc.), and often have a need to delegate authorization to specific IT resources, which are authorized to them, to other co-workers and business associates, who will need them to perform the tasks otherwise performed by the out of office co-worker.

One problem that enterprises often have to deal with in an on-line environment is the reset of passwords and suspended accounts. Industry statistics show that it is one of the largest costs associated with customer service, and also that is a security issue.

Telephone support personnel are asked to "test" the caller with predetermined questions to authenticate the callers identity. Upon authentication, telephone support personnel can manually reset a user password or reinstate a suspended user's account.

Delegating authorization to reset a password to other trusted co-workers, or a "Trusted Circle" is a process that deals with this problem in a more secure fashion without an expensive phone call to customer support. The systems and methods herein deliver an implementation of a Trusted Circle process.

Figure 1:
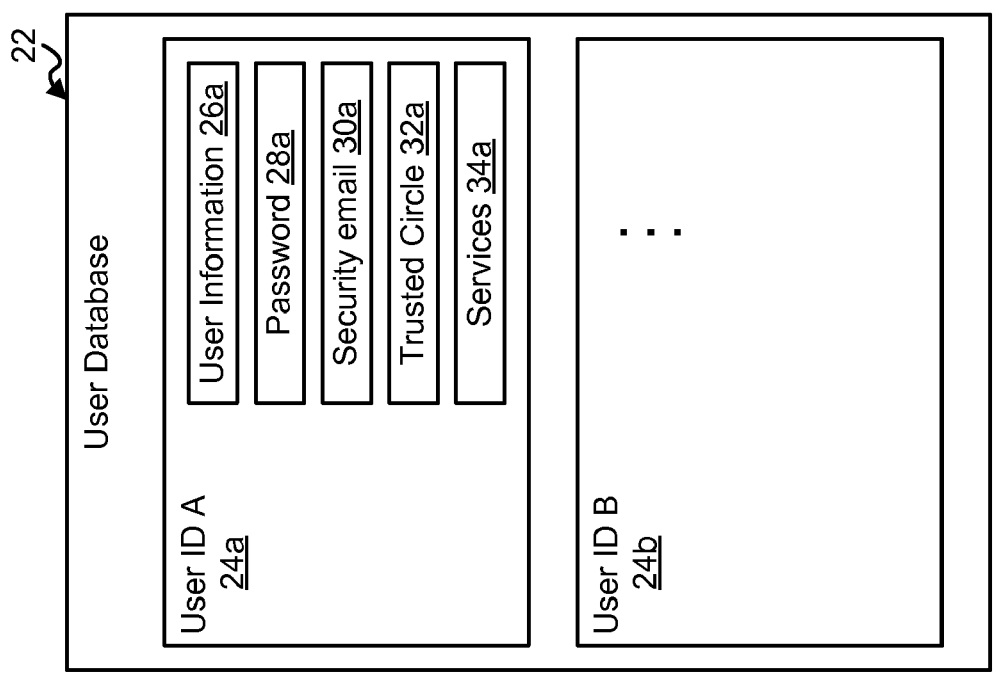
FIG. 1 is a block diagram of one possible configuration of a user database.

FIG. 1 is a block diagram of one possible configuration of a user database 22. Enterprises need individuals (customers, employees, suppliers, etc.) to establish an electronic identity. This allows the enterprise to transact business in a much more efficient and cost-effective manner. This electronic identity is illustrated in FIG. 1 as a user identification (ID) 24. Examples of user IDs are shown as user ID A 24*a* and user ID B 24*b*. User information 26*a* may be stored about the user and may include personal or biographical information, such as a person's name, date of birth, city of residence, etc. In addition, the user information 26*a* may also include one or more common governmental identifiers. In one possible configuration, the user information 26*a* may include a person's name, residence address, e-mail address, driver's license number, telephone number, social security number and user-id.

This electronic identity is generally connected to some authentication token like a password 28*a* or a personal identification number (PIN). In some configurations, a hash of the password 28*a* is stored rather than storing the password in clear text.

A security email 30*a* may be included for messages to be sent to the user about account changes. When the individual establishes an identity they may be requested to establish this e-mail address 30*a* where communications are sent whenever critical security actions are taken. The security e-mail 30*a* should exist on a system that is not protected by the user-id 24 and password 28a. It should be an independent, reputable e-mail service. An enterprise may choose not to require this security e-mail address 30a.

Examples of critical security actions include, but are not limited to, a change of important identity information such as name 26a, user-id, password 28a, and secret questions/answers. Other examples include important functions like the resetting of a suspended account or a call to customer support. This communication allows an individual to monitor activity on the account and detect possible fraudulent identity changes.

The security e-mail address 30a is also used to communicate the new password when it is reset by a member of the trusted circle 32a. The password is never available to anyone except the user who can access the security email 30a.

As will be more fully discussed below, the user ID 24a also includes a trusted circle 32a for the user. The electronic identity is also connected to the services 34a that the individual is allowed to access.

Users have many electronic identities and often forget the user-id portion of their electronic identity. A common security practice is to encourage and/or force users to change passwords on a regular basis. Users sometimes accidentally suspend their accounts. Most sites suspend accounts after some number of unsuccessful authentication attempts for a variety of security reasons. Account suspensions occur when a user forgets that they recently changed their password, or that they have activated the "Cap Lock" on their keyboard when they attempt to enter the password, or are administratively suspended for some reason.

Many sites attempt to solve some of these problems by allowing the individual to record "hints" to help recall their password. The quality of this approach depends on the ability of the individual to come up with a good hint without giving away the password. Another approach is a set of "secret" questions and answers that allow the individual another password method.

Often users call a support representative. The first challenge the support representative has is to authenticate the individual. Authentication is done using pass phrases, secret questions and answers, or simply random questions based on the person's interaction with the enterprise. If the caller passes the test, there are a variety of methods to restore service with varying levels of security.

Using a trusted circle 32a solves this common problem by taking advantage of the user's trusted circle of co-workers, rather than depending upon support staff for password resets. FIG. 2 is a block diagram of one possible configuration of a trusted circle 32 for a particular user. The trusted circle data 32 includes the different users that are in the trusted circle 32 for the owner of the account with that particular trusted circle 32. By way of example, FIG. 2 illustrates that trusted user A 36a and trusted user B 36b are both in the trusted circle 32 for the owner of this account. With the trusted circle 32 an account owner is allowed to authorize a circle of colleagues (e.g., trusted user A 36a and trusted user B 36b) to know the user-id, reset the password, or activate a suspended account. The privileges that a trusted user 36 has are indicated in the user authorizations 38. As shown, each trusted user has a set of user authorizations 38a, 38b. Being part of the trusted circle 32 does not allow the co-worker access to the owner's account or allow the friend to gain access to the password 28.

FIG. 3 is a diagram of one possible configuration for a set of authorizations 38. In the example of FIG. 3, the authorizations 38 include the ability to reset a password or reinstate a suspended account. The owner of the account may be given the ability to specifically assign certain privileges to users in his or her trusted circle 32 individually.

Figure 4:
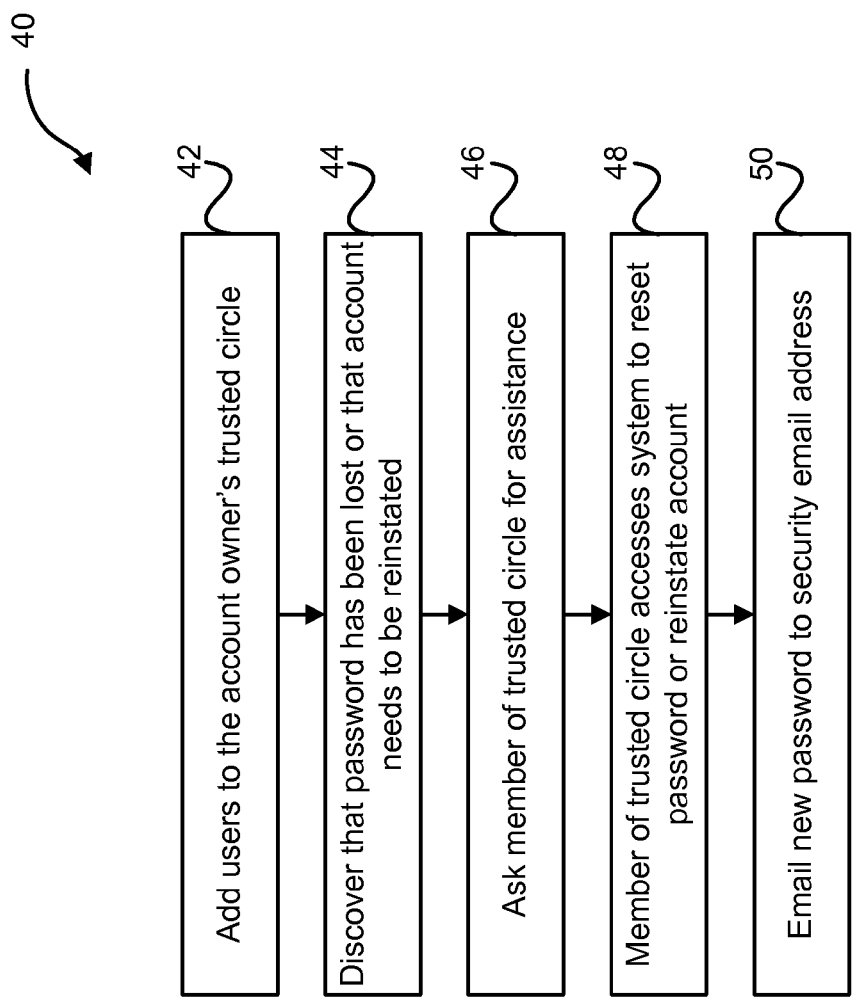
FIG. 4 is a flow diagram of one possible method for using a trusted circle.

FIG. 4 is a flow diagram of one possible method 40 for using a trusted circle 32. By way of example, if an account owner had an account on a system, the account owner could add 42 his or her department administrator, supervisor and two co-workers in the account owner's trusted circle 32, who also have accounts on the system. The account owner then discovers 44 that he forgot his password or that he needs to have his account reinstated. The account owner could ask 46 one of the members of his trusted circle 32, suppose the supervisor, to reset his or her password. The supervisor would access 48 the system using his own user-id and password and then reset the password or reinstate the account. In certain configurations, the new password may be a system-generated one-use password. Such a password is not determined by the trusted user. If the password had been reset, the new password may be e-mailed 50 to the security email address 30a that had been established when creating the account. This would not give the supervisor access to the account owner's account or to the new password.

The trusted circle solution is more secure than relying on a telephone support staff and is a more timely solution for the user. The individuals in a person's trusted circle should be able to identify the person without a list of qualifying questions. A trusted circle 32 allows the individual to identify a de facto customer support organization that is composed of friends and trusted colleagues. The functions of resetting passwords and suspended accounts are delegated and distributed to the trusted circle 32 and remain under the individual's control. For the enterprise, using a trusted circle 32 will reduce support costs and improve security.

Figure 5:
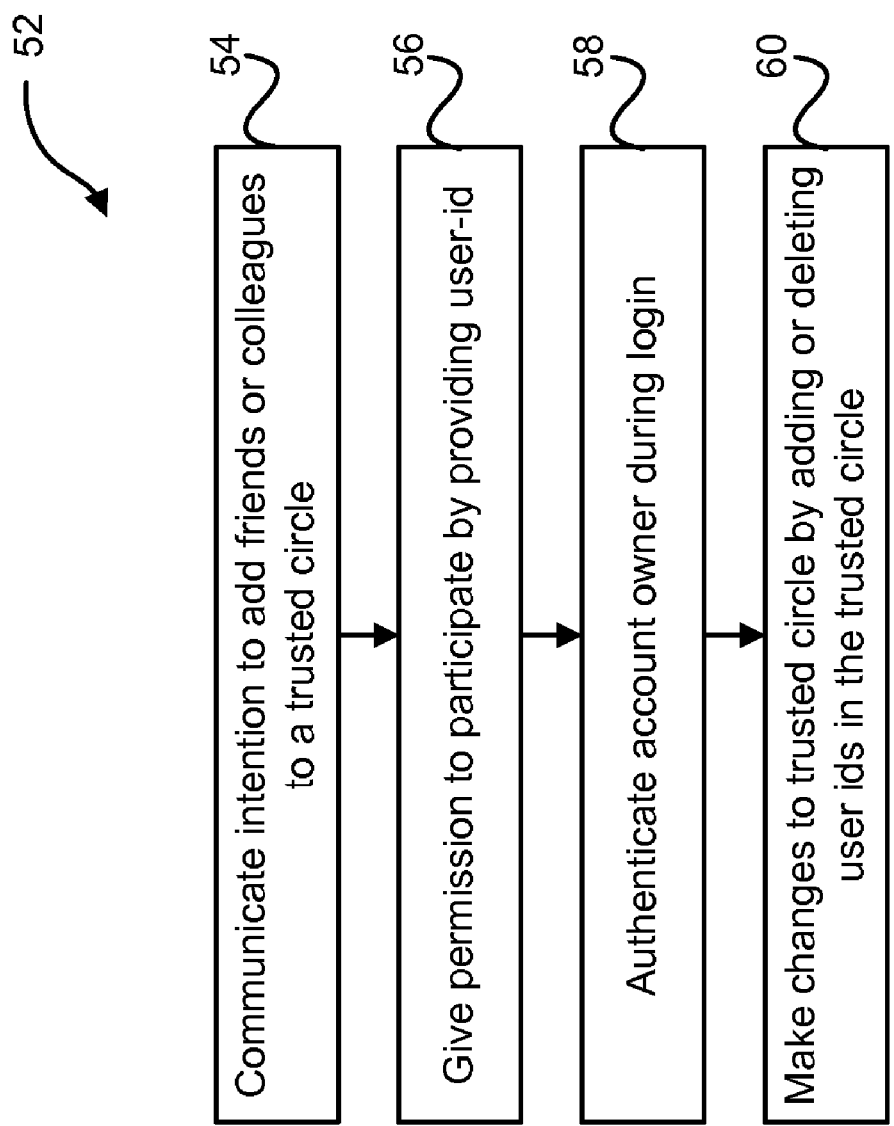
FIG. 5 is a flow diagram of one possible method for creating a trusted circle.

FIG. 5 is a flow diagram of one possible method 52 for creating a trusted circle 32. An account owner communicates 54 to a set of friends and colleagues an intention to create a trusted circle 32. They may give their permission to participate by providing 56 their user-IDs. User-ID's should not be available through a public search site.

A trusted circle 32 may be established on a secure web page. Authentication 58 to the system is required in order to access the web page. The account owner may make changes 60 by adding or deleting the set of user-ids in the trusted circle 32. When a user-id is added to a trusted circle, an e-mail may be sent to the security e-mail address of the friend or colleague notifying them of the change. If the friend is not comfortable, she may request that she be removed from the trusted circle. She may also go on the system and block participation in a trusted circle. The owner of the trusted circle would receive an e-mail notification of the blocking action. It is possible that blocking may be used on the customer support organization. In certain situations, an enterprise may remove this option. In essence, this provides the ability to secure an account from fraudulent attacks through customer support.

Figure 6:
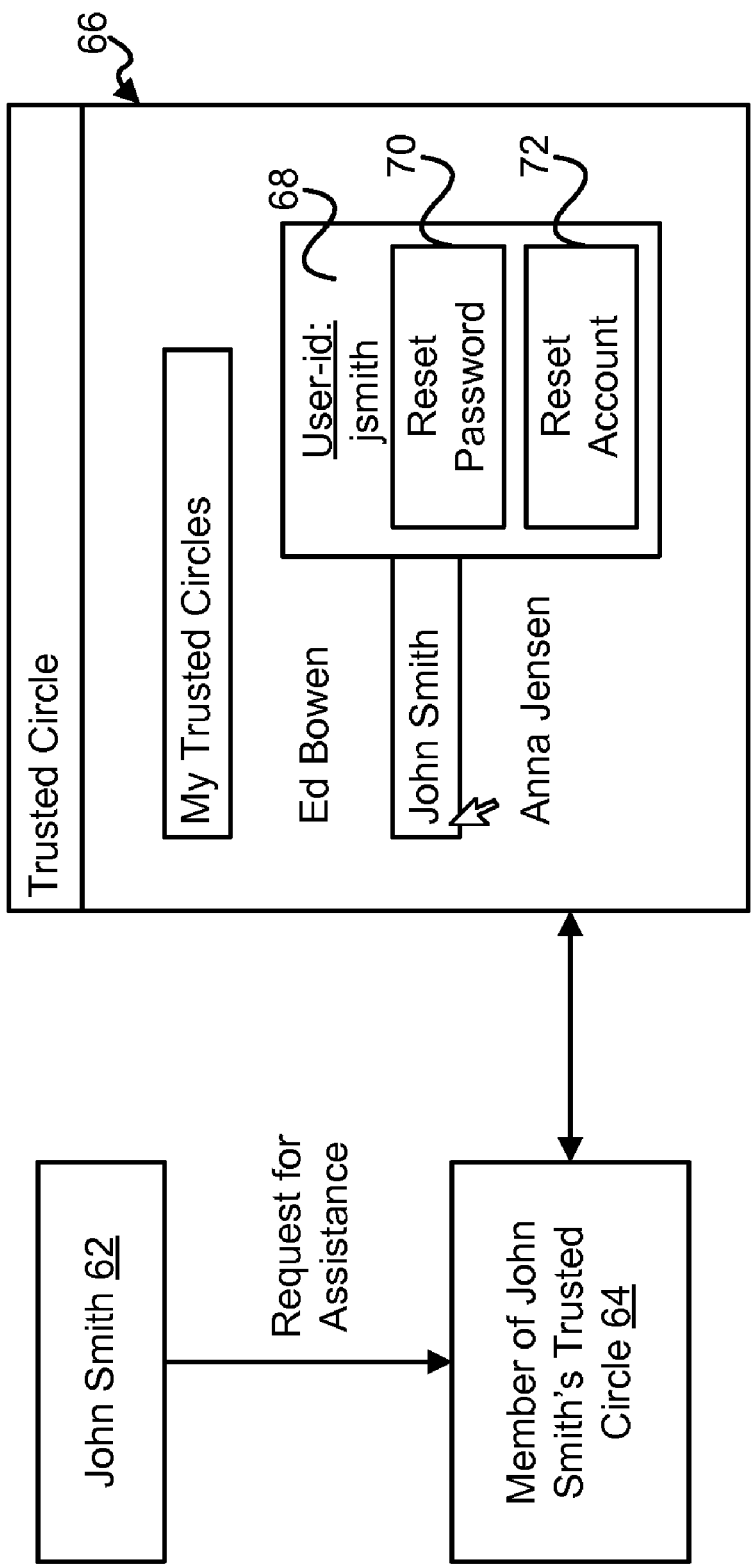
FIG. 6 is a high-level flow diagram illustrating a user interface that may be used when the trusted circle is used for assistance.

FIG. 6 is a high-level flow diagram illustrating a user interface that may be used when the trusted circle is used for assistance. To help describe FIG. 6, an example will be used of an account owner 62, John Smith, who is in need of assistance. If the account owner 62 has established a trusted circle for his account, then when he has a problem with a system password, he could solve the problem by using his trusted circle in the following manner.

Upon realizing that he could not remember his password, the account owner John Smith 62 could request assistance from a member 64 of his trusted circle. The member 64 of the trusted circle could then access the system with his own user-id and password. He would have access to a web page 66 that contains all of the user-ids of people that have included him in their trusted circle. If the problem is that the account owner John Smith 62 had forgotten his user-id, the trusted circle member 64 may identify the user-id and provide it to John Smith from the user-id portion 68 of the exemplary web page. If the problem is that John Smith had forgotten his password or suspended his account, the trusted circle member 64 may be able to reset the password 70 or reset the suspended account 72 from the web page. This would not give the trusted circle member 64 access to John Smith's account or password. The system may generate a new, random password that is set to expire after a single use. If the account is suspended, it may reset it to active. All of these actions are recorded in an audit trail.

If a new password was generated, the new password may be emailed to the security e-mail address 30*a* contained in the account owner's profile 24. The e-mail may indicate which friend helped reset the password. When John Smith 62 retrieved the new password from his security e-mail address 30*a*, he may then use it to access the system. The system may immediately require him to change the new password. At this point, John Smith 62 has restored access to his account. This implementation does not create the possibility that the account can be compromised by a trusted co-worker unless the account owner also gave the co-worker access to his security e-mail address 30*a*.

The trusted circle systems and methods may be implemented in various ways. In the description below, a hub manager and its operation is described. The trusted circle systems and methods may be implemented through use of the hub manager. For example, consider the password reset by a trusted circle. A login/password reset relationship may be created between members of a trusted circle to the creator of the trusted circle in a hub manager, thus delegating to the members of a trusted circle the ability to reset a specific login/password. The resetting of a user login/password may be accomplished in a hub manager from a user web application. The hub manager may send a (synchronization) message to all systems that utilize the same login/password that is being reset. All those systems that utilize the same login/password may then be reset to the new login/password.

The system may be configured only to reset those systems login/password which share a common login/password. Any system which uses a different login/password may not receive a message to reset the login/password from the hub manager via a spoke manager, which will also be more fully discussed below.

Customer Support Representatives (CSR's) have the difficult task of diagnosing and solving computer problems for other users. Often this must be done remotely. Some tools have been built to aid this process. For example, some tools allow customer support personnel to "see" the screen of the user as they work. In certain instances, they can even take over the machine. Of course, all of these solutions have the potentials for abuse of security rights. Unfortunately, a common solution is for the CSR to talk the user into providing a password so that the CSR can log on as the user. This isn't a very good solution for a number of security reasons.

Delegation may provide another tool for customer support personnel to approach the problem. Delegation provides the ability for a user to delegate authorizations to customer support in order to facilitate assistance. Delegation may be used with many different kinds of systems and services.

Figure 7:
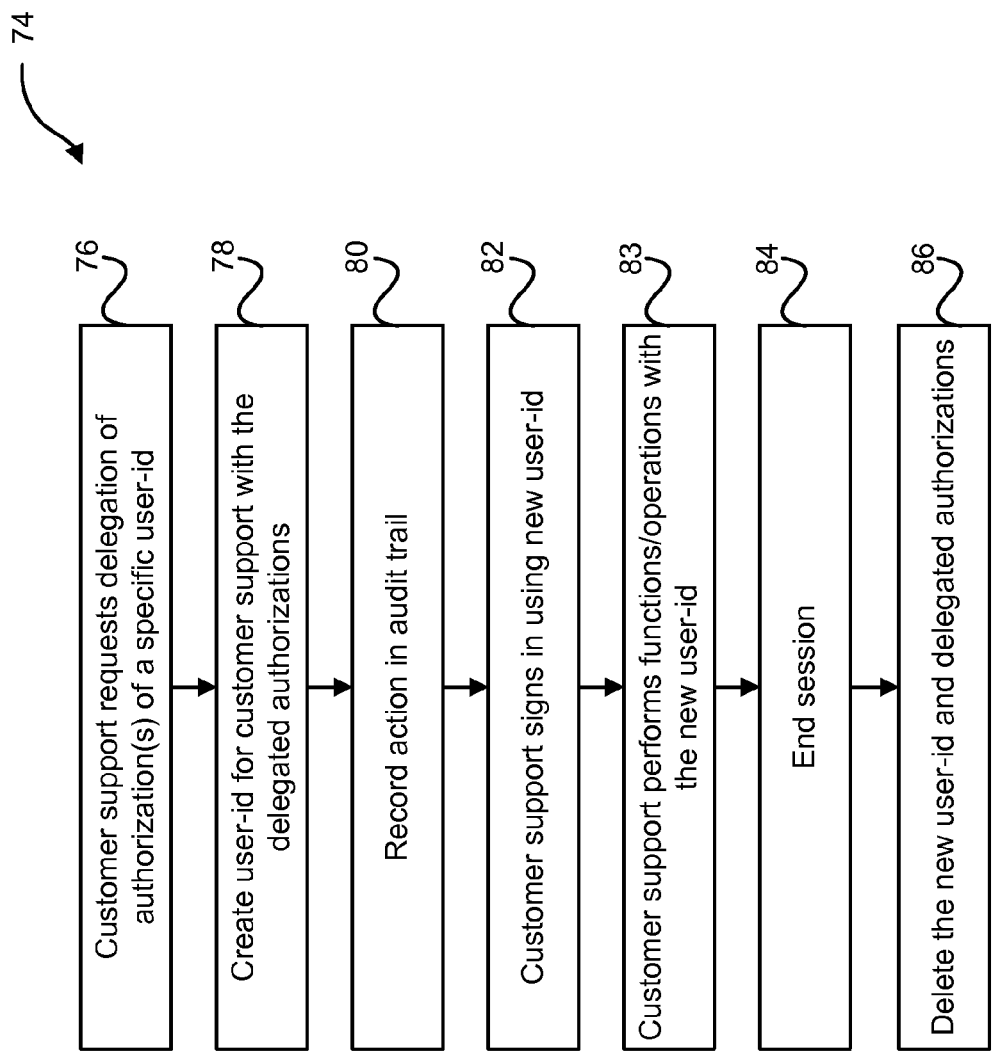
FIG. 7 is a flow diagram of one possible method for using delegation.

FIG. 7 is a flow diagram of one possible method 74 for using delegation. The CSR requests 76 delegation of authorization of a specific user-id into a specific application. The delegation system and method creates 78 a user-id for the CSR with the same specific application authorizations as the user they are helping by sending the target application a provisioning message for the CSR. This action is recorded 80 in a delegation audit trail.

At this point, the CSR may sign on 82 to the target application with their own user-id and password and be authorized the same specific application authorizations as the user requesting assistance. The audit trails built into that application will be effective because the CSR is not working with someone else's user-id, but rather their own. The CSR may then perform 83 functions/operations with the new user-id to assist user, as needed.

When the CSR is finished, they will end 84 the session. This action is also recorded in a delegation audit trail. Delegation systems and methods then delete 86 the user-id and the authorizations of the CSR in the target system by sending another (de)provisioning message.

Records are kept when a delegated user session begins and when it ends. Any actions that the CSR takes while in authorization delegation mode may be recorded with his user-id rather than that of the user-id of the person he is helping. Security e-mails are sent to the user that is being helped and appropriate supervisors.

Delegation may be used in different contexts besides the above example. For example, delegation may be used when an employee knows that they will be away from the office (i.e. business trip, vacation, sick and maternity leave, sabbatical, etc.) and they have certain authorizations for IT resources. The employee with certain authorizations for IT resources may delegate authorization to specific IT resources, which are authorized to them, to other co-workers and business associates, who will need them to perform the tasks otherwise performed by the out of office co-worker.

Many different kinds of systems, services and databases may be used to store and manage information relating to users, including trusted circle information. These different kinds of systems and databases may be used in combination with the trusted circle and delegation systems and methods discussed herein. One possible implementation of a database management system that has the ability to integrate multiple databases and/or systems will be set forth below with references to FIGS. 8-15. Although the discussion in FIGS. 8-15 may be more general in its description, the systems and methods therein may be used as an exemplary database system for managing users, data, content, services, etc.

Most business applications include two general types of data. The first may be transactional data. Examples of transactional data may include orders, shipments, invoices, payments, etc. Transactional data may utilize a high degree of control in order to maintain its integrity. This type of data may be managed by a single, highly integrated application, which may be highly dynamic or attended by a large volume of activity.

The second type of data may include reference data. Examples of reference data may include customers, employees, products, services, accounts, locations, etc. While an important level of control may be utilized in order for reference data to maintain its integrity, it may be common for several business applications in an enterprise to maintain the same reference data. It may be beneficial if this type of data could be created, edited, changed, deleted, etc. by each individual business application in the manner that is was designed to function. Further, it would be beneficial if each individual business application could share common data with the other business applications in the enterprise. For example, it may be beneficial if all of the systems in a business that deal with a certain customer could identify that customer in the same way.

Transactional data may be controlled by tightly-coupled data management techniques. For example, a change to an order amount may occur in the same database transaction that affects the inventory levels of the product. However, tightly-coupled application systems are more expensive to develop and maintain than loosely-coupled application systems.

Reference data generally doesn't require tightly-coupled data management techniques. Instead, this type of data can generally be handled with loosely-coupled data management techniques. A change to an individual's address in one application should be shared with all of the other applications within the business enterprise, but it may be acceptable if it takes several seconds or minutes to synchronize this changed data with the other applications.

The present systems and methods enable a business enterprise to loosely-couple reference data with the multiple business systems, applications and infrastructure. The present systems and methods may loosely-couple reference data with asynchronous messages which may guarantee delivery of the message to each system and application within the business enterprise. For example, the present systems and methods allow an application to complete a change to an attribute associated with reference data and continue the normal operations the application is designed to perform. The present systems and methods may operate in the background and send a message including information about the change to additional systems and applications within the business enterprise. When the additional applications are available, they may accept the message and process the change.

A benefit of the present systems and methods is that if any systems are unavailable for any reason (i.e. off-line) the integrity of the reference data will not be jeopardized. The remaining systems that are available will continue to be synchronized and continue with accurate, updated data attributes.

Current systems and methods generally require data structures of the different applications to be identical or very similar. At the very least, the reference data typically has been required to share a common data attribute that uniquely identifies reference data. Such requirements have not enabled current systems and methods to be sufficiently loosely-coupled. Further, it is expensive for dissimilar applications to share reference data.

Figure 8:
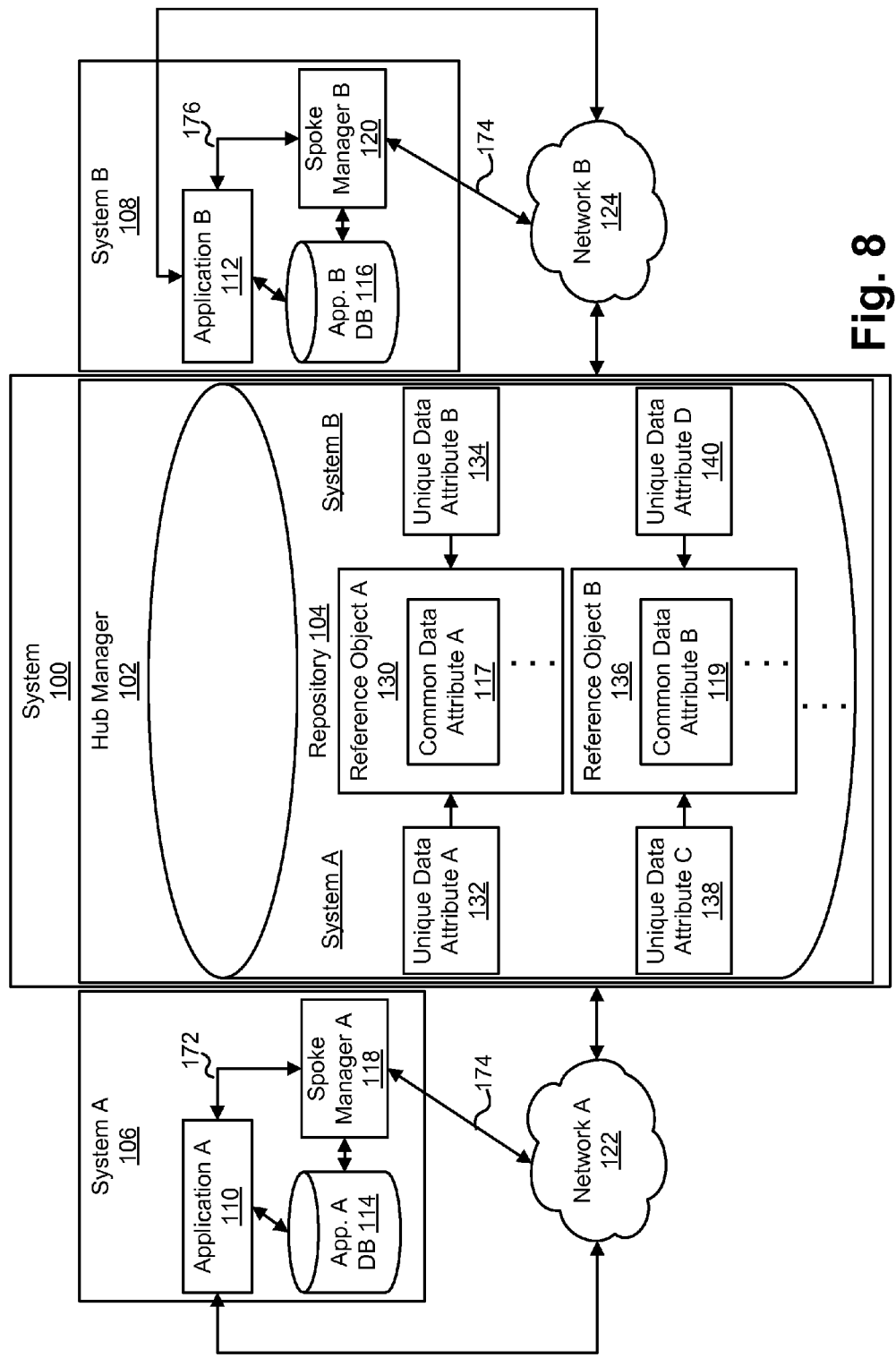
FIG. 8 is a block diagram illustrating one embodiment of a system in communication with a plurality of systems and applications.

FIG. 8 is a block diagram illustrating one embodiment of a system 100 in communication with system A 106 and system B 108. Although FIG. 8 only depicts the system 100 in communication with the two systems 106, 108, it is to be understood that the system 100 may be in communication with more than two systems. For example, numerous systems may be connected in a star configuration with the system 100 at the center. In some embodiments the different systems 100, 106, 108 may be located in different geographic regions across a country and/or across the world. In other embodiments the different systems 100, 106, 108 may be located within the same facility.

System A 106 and system B 108 may include any type of computing device such as a personal computer, laptop, personal digital assistant (PDA), computer server, etc. Systems A and B 106, 108 may include application A 110 and application B 112, respectively. Applications A and B 110, 112 may include software that employs the capabilities of systems A and B 106, 108 to execute a task. In one embodiment, applications A and B 110, 112 may utilize different data structures. Different data structures may be suited to different types of applications, such as applications A and B 110, 112.

Systems A and B 106, 108 may also include application A database 114 and application B database 116, respectively. The databases 114, 116 may include a stored collection of data that may be accessed by applications A and B 110, 112. In one embodiment, systems A and B 106, 108 may also include spoke manager A 118 and spoke manager B 120, respectively. Spoke managers A and B 118, 120 may send/receive data to/from applications A and B 110, 112, respectively. In addition, spoke managers A and B 118, 120 may send/receive data to/from application A database 114 and application B database 116, respectively. In one embodiment, spoke manager A 118 sends/receives data to/from application A 110 in a first format 172. In another embodiment, spoke manager B 120 sends/receives data to/from application B 112 in a second format 176. The first format 172 may be different from the second format 176. Spoke manager A 118 may also send/receive data to/from the system 100. In one embodiment, spoke manager A 118 sends/receives data to/from the system 100 in a third format 174. In another embodiment, spoke manager B 120 also sends/receives data to/from the system 100 in the third format 174.

Spoke managers A and B 118, 120 may communicate with the system 100 over network A 122 and network B 124, respectively. While the illustrated embodiment only illustrates two networks, it is to be understood that the system 100 may communicate with any number of systems over any number of networks. In one embodiment, the system 100 includes a hub manager 102. The hub manager 102 may act as a broker for all the data sent to or received from the various systems and applications. For example, the hub manager 102 may send/receive messages to/from the various systems and applications. In one embodiment, the hub manager 102 may include a repository 104. The repository 104 may store data included within the various systems communicating with the system 100, such as systems A and B 106, 108. In one embodiment, repository 104 may include a plurality of reference objects, such as reference object A 130 and reference object B 136. Reference object A and B 130, 136 may be a record of data relating to the identity of an individual, product, etc. For example, reference object A 130 may be an employee record and reference object B 136 may be a customer record. Each reference object includes common data attributes. Reference object A 130 may include common data attributes A 117 and reference object B 136 may include common data attributes B 119. Common data attributes may include data that is shared between systems, such as system A 106 and system B 108. An example of a common data attribute may include the name of the entity being identified by the reference object. Further examples of common data attributes may include an address, date of birth, email address, etc.

In one embodiment, spoke managers may be deployed to each system and application within a business enterprise. Spoke managers may communicate directly with the hub manager 102 and translate standard messages sent from the hub manager 102 to the system or application. Data translations or data transformations may include data mapping and data formatting. In one embodiment, data mapping identifies the location of specific required data in a table of one system and application and "maps" it to a location of data with the same attributes of another system and application. In one embodiment, data formatting defines a physical format of the data.

Each spoke manager may be very specific to the particular business system or application on which it resides. Including spoke managers with every system and application may allow a business enterprise to scale more easily. For example, the addition of another business application simply means adding a new spoke manager specific to that application. In one embodiment, adding additional systems or applications does not require changes to the hub manager 102 because the spoke manager provides the translation of data formats between the systems and applications and the hub manager 102. In one embodiment, business systems and applications may be deployed on a variety of technology platforms, data management tools and application development environments.

Spoke manager A 118 and spoke manager B 120 may implement a unique data attribute to uniquely identify each reference object. For example, spoke manager A 118 may implement unique data attribute A 132 and spoke manager B 120 may implement unique data attribute B 134 to identify reference object A 130. Similarly, spoke manager A 118 may implement unique data attribute C 138 and spoke manager B 120 may implement unique data attribute D 140 to uniquely identify reference object B 136. In one embodiment, the repository is aware of each unique data attribute and the value of such attribute that each spoke manager implements to identify a particular reference object. The following scenario may further illustrate this concept.

A human resource system of a business may implement the unique data attribute of "Employee_id" to uniquely identify the reference object of an employee record of the employee associated with the employee identification indicated by "Employee_id". An accounting system of the same business may use the unique data attribute of "Employee_tax_id" to uniquely identify the employee record of an employee. For purposes of illustration, the "Employee_id" may be "789" and the "Employee_tax_id" may be "A52". The employee record may include one or more common data attributes, such as name, address, date of birth, etc. In one embodiment, the employee with the "Employee_id" of "789" may change his/her address through an application on the human resource system. The accounting system may not be able to be updated with the new address because the accounting system identifies employee records with a different data attribute (i.e., "Employee_tax_id").

In one embodiment, the repository 104 stores the employee's information such that the hub manager is aware that the employee identification is "789" and the employee tax identification is "A52". The repository 104 may translate a message associated with "Employee_id=789" that is updating a common data attribute to a message that includes "Employee_tax_id=A52" before the message is sent to the accounting system.

In this embodiment, the hub manager 102 is aware of which unique data attribute (and its value) each spoke manager uses to uniquely identify a reference object. The hub manager 102 is also aware of each of the plurality of reference objects that a particular enterprise may use (i.e., employee records, customer records, product record, etc.). Further, the hub manager 102 is aware of each common data attribute included with each reference object. The repository 104 associates each reference object with the unique data attribute each spoke manager uses to uniquely identify the reference object.

Figure 9:
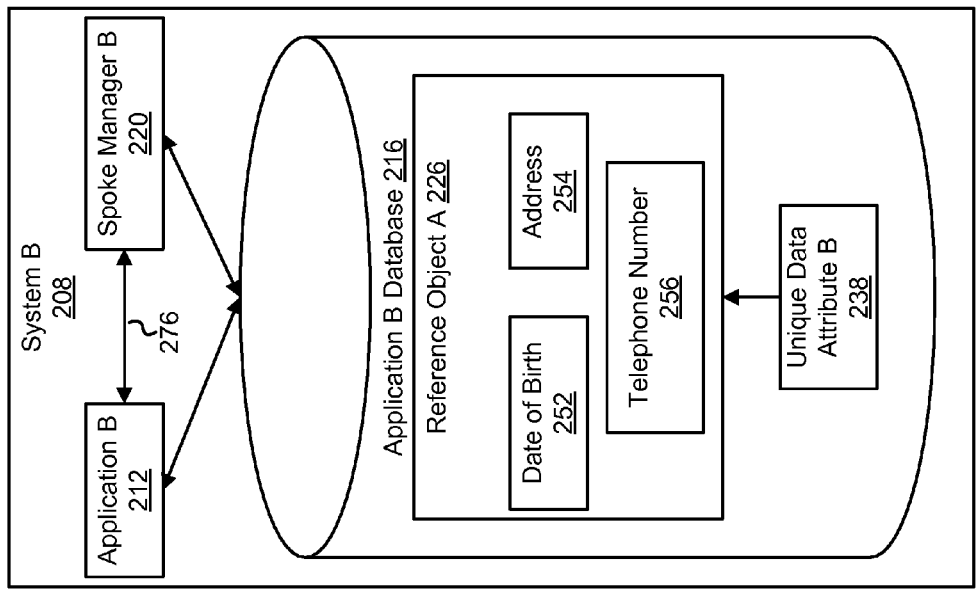
FIG. 9 is a block diagram illustrating embodiments of databases.
Figure 9:
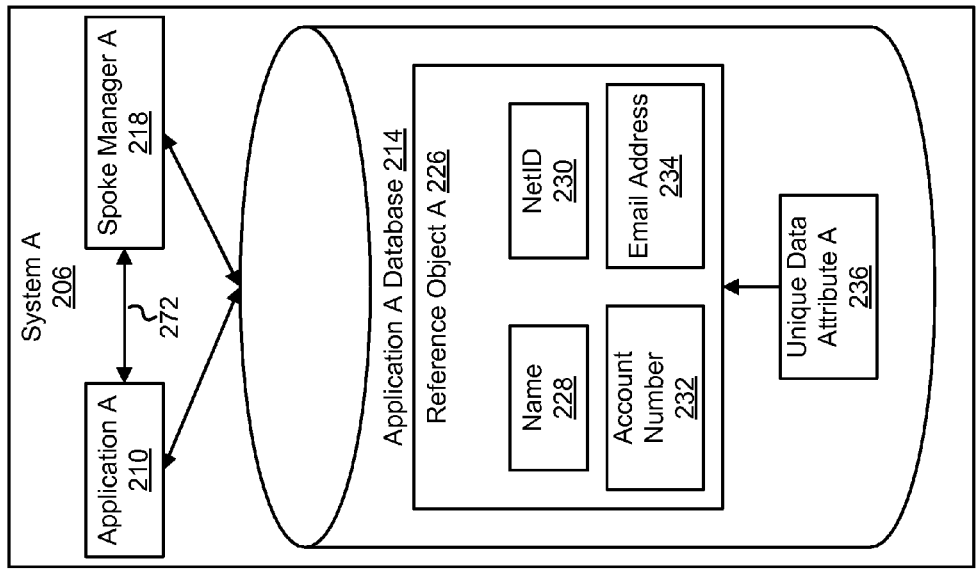

FIG. 9 is a block diagram illustrating embodiments of databases. As illustrated, spoke manager A 218 may send/receive data to/from application A 210 using a first data format 272. Spoke manager B 220 may send/receive data to/from application B 212 using a second data format 276. Applications A and B 210, 212 may obtain data from application A database 214 and application B database 216, respectively. In one embodiment, spoke manager A 218 may communicate directly with application A database 214 and spoke manager B 220 may communicate directly with application B database 216.

Application A database 214 and application B database 216 may include one or more reference objects, such as reference object A 226. Reference object A 226 may identify a particular type of entity that is associated with one or more common data attributes. For example, reference object A 226 may identify customers, employees, business entities, products, services, accounts, locations, etc. In one embodiment, reference object A 226 may include common data attributes relating to the entity identified by reference object A 226. In the depicted embodiment, the reference object A 226 identifies a customer and may include common data attributes further relating to the identity of the customer. It is to be understood that additional reference objects may include common data attributes that further relate to the identity of other entities in addition to customers. In one embodiment, reference object A 226 includes common data attributes such as name 228, NetID 230, account number 232 and email address 234. While only four examples of common data attributes are listed, it is to be understood that reference object A 226 may include other common data attributes. For example, common data attributes may include date of birth, residential address, business address, social security number, account numbers, etc.

Spoke manager A 218 and spoke manager B 220 may each uniquely identify the reference object A 226 with a different unique data attribute. For example, spoke manager A 218 may identify reference object A 226 using unique data attribute A 236 while spoke manager B 220 identifies reference object A 226 using unique data attribute B 238.

In addition, application A 210 and application B 212 may use different common data attributes of reference object A 226. For example, application A 210 may use the common attributes of name 228, NetID 230, account number 232 and email address 234. Application may use the common data attributes of data of birth 252, address 254 and telephone number 256.

Figure 10:
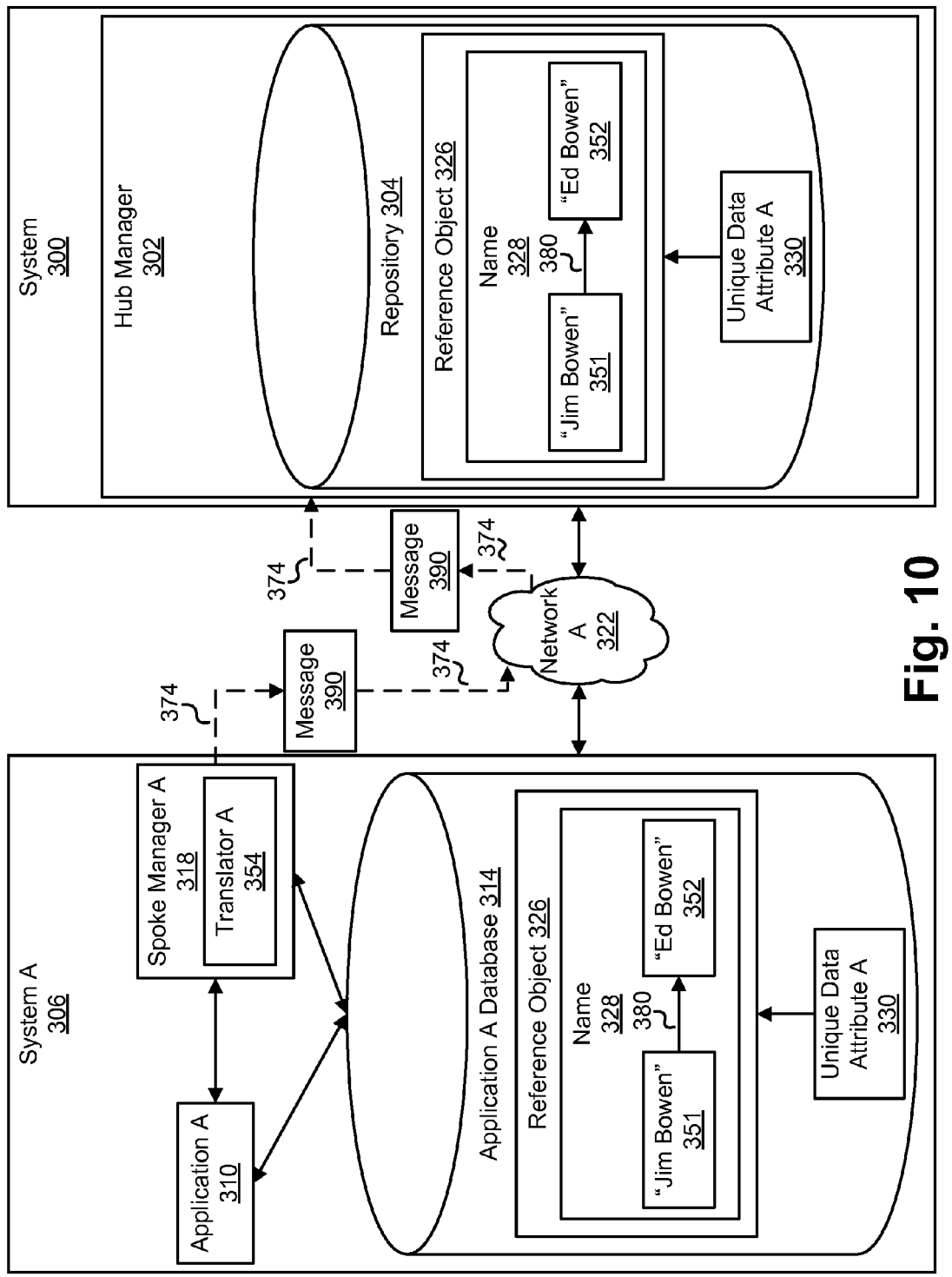
FIG. 10 is a block diagram illustrating one embodiment of spoke manager sending a message to a hub manager.

FIG. 10 is a block diagram illustrating one embodiment of spoke manager A 318 sending a message 390 to a hub manager 302. While only system A 306 is illustrated with spoke manager A 318 communicating with the hub manager 302, it is to be understood that additional systems and spoke managers may communicate with the hub manager 302 in a similar manner as explained below. In one embodiment, system A 306 communicates with a system 300 over network A 322. Application A 310 and spoke manager A 318 may be included within system A 306. In one embodiment, application A 310 facilitates a customer to provide data associated with common data attributes. For example, the customer, using application A 310, may provide the name "Ed Bowen" 352. Application A 310 may communicate the name "Ed Bowen" 352 to application A database 314. Application A database 314 may store the name "Ed Bowen" 352.

In one embodiment, the name "Ed Bowen" 352 is associated with the common data attribute of name 328. The name attribute 328, as previously explained, may be included as a common data attribute of reference object 326. In this example, the reference object 326 may be a customer record that identifies a particular customer.

In one embodiment, application A database 314 may have previously stored the name "Jim Bowen" 351. When application A 310 communicates the name "Ed Bowen" 352 to application A database 314, the name "Jim Bowen" 351 may change 380 to the name "Ed Bowen" 352. This scenario may illustrate the situation where the first name entered, "Jim Bowen", was incorrect and should have been "Ed Bowen." In this embodiment, the common data attribute of name 328 is changed.

In one embodiment, spoke manager A 318 may send a message 390 including the change in the common attribute of name 328 to the hub manager 302. In an additional embodiment, the message 390 may include all the common data attributes included with the reference object 326. For example, the reference object 326 may include several common data attributes, such as email, NetID, address etc. A change to any common data attribute, such as the may cause a synchronization message 390 to be sent which includes all of the common data attributes of the reference object 326. In other words, the message 390 may include common data attributes that have not been modified. In the illustrated example, the hub manager 302 detects from the synchronization message that a common data attribute of the reference object 326 has changed.

Spoke manager A 318 may gather all the common data attributes of the reference object 326 and perform data translations if necessary. Spoke manager A 318 may package the message 390 in a first data format 374. In one embodiment, spoke manager A 318 includes translator A 354 which facilitates the translation of the reference object 326 if necessary. The message 390 may be in the form of a simple record that includes unique data attribute A 330. Unique data attribute A 330 may be used by spoke manager A 318 to uniquely identify the reference object 326. Spoke manager A 318 may send the message 390 to the hub manager 302 over network A 322. Changes to common data attributes associated with the reference object 326 may be communicated to the hub manager 302. In a further embodiment, application A 310 updates reference information by writing a queue record in application A database 314. Spoke manager A 318 may monitor the database 314 and take action based on the queue records in the database 314. In another embodiment, application A 310 may not include an application programming interface (API) that spoke manager A 318 may work with. In this instance, spoke manager A 318 may access data directly from application A database 314.

In the illustrated example, the hub manager 302 detects from the synchronization message 390 that a common data attribute of the reference object 326 has changed. In one embodiment, the hub manager 302 may define a packet of information for the reference object 326 which includes all the common data attributes of the reference object 326. The packet of information included in the hub manager 302 may be a superset of data from each system and application including the reference object 326. In one embodiment, the hub manager 302 maintains a repository 304 with the reference object 326 and each of the common data attributes of the reference object 326. In addition, as previously explained, the repository 304 includes which unique data attribute each spoke manager of various system uses to unique identify the reference object 326.

In one embodiment, the hub manager 302 may receive the message 390 which includes unique data attribute A 330. The hub manager 302 is aware that spoke manager A 318 uses unique data attribute A 330 to identify the reference object 326. The hub manager 302 may processes the message 390 in order to update the common data attributes associated with the reference object 326 stored in the repository 304. For example, the common data attribute of name 328 is changed 380 from "Jim Bowen" 351 to "Ed Bowen" 352.

Figure 11:
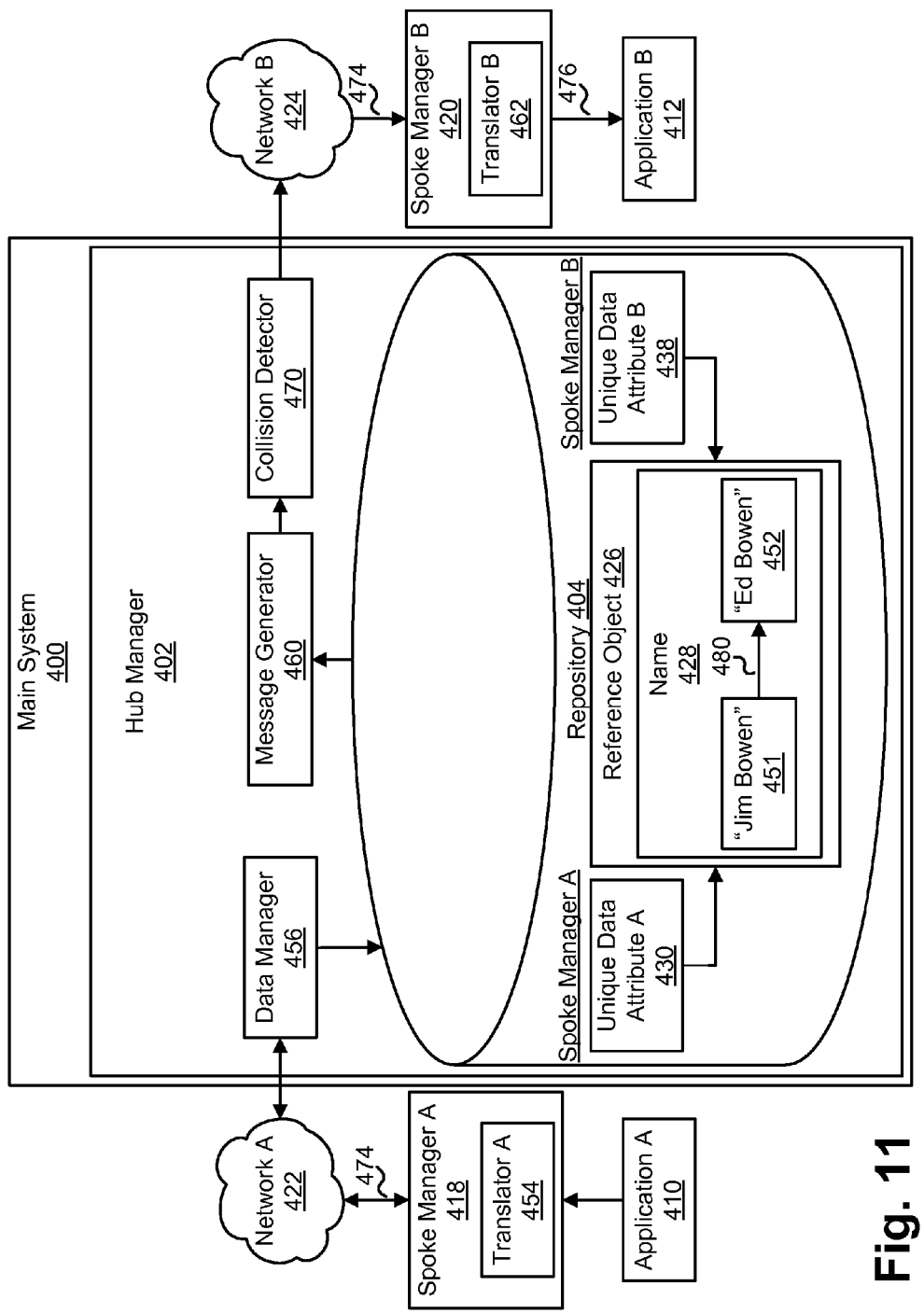
FIG. 11 is a block diagram illustrating one embodiment of a hub manager sending a synchronization message to additional applications.

FIG. 11 is a block diagram illustrating one embodiment of a hub manager 402 sending a synchronization message to additional spoke managers. In one embodiment, spoke manager A 418 may build a message in a first data format 474. Translator A 454 may be used to format the message in the first data format 474. In other words, each spoke manager sends/receives messages to/from the hub manager 402 in a single format per reference object. The message may include all the common data attributes associated with the reference object stored in application A database (not shown). The first data format 474 indicates the unique data attribute being used by spoke manager A to uniquely identify the reference object 426.

Spoke manager A 418 may send the message in the first data format 474 to a data manager 456 over network A 422. In one embodiment, the data manager 456 is included within a hub manager 402. In one embodiment, spoke manager A 418 may require additional information in order to build the message. Additional information may be retrieved from the hub manager 402 in order to build a complete message. For example, the additional information may be retrieved through synchronous web services messages. In one embodiment, the data manager 456 receives requests from spoke manager A 418 for the web services.

The hub manager 402 processes the message and determines which reference object is identified from the unique data attribute included in the message. In this example, the message includes unique data attribute A 430 which identifies the reference object 426. In one embodiment, the common data attribute of name 428 included in the reference object 426 is changed 480 from "Jim Bowen" 451 to "Ed Bowen" 452. The reference object 426 stored in the repository 404 may be updated with the changed common data attribute included in the message.

A message generator 460 may generate a synchronization message that includes updates to any of the common data attributes of the reference object 426. A collision detector 470 may be used before the hub manager sends synchronization messages to other spoke systems to notify them of any updates to common data attributes. The collision detector 470 detects the most recent synchronization message for a given reference object and only allows the most current messages generated by the message generator 460 to be sent to additional spoke managers. Collision detection occurs when a particular spoke system is synchronized on a scheduled time interval as opposed to an on-demand synchronization. In one embodiment, the hub manager 402 is aware which spoke managers are configured for a scheduled synchronization and when that is to occur. Synchronization messages may be placed in a cue between scheduled synchronization events and only the most recent messages are sent and the others are discarded at that time. The collision detector 470 verifies that only the most accurate common data attributes are included on each reference object in every spoke system that needs that particular common data attribute.

The synchronization message may be sent to application B 412, through spoke manager B 420. Because the hub manager 402 is aware that spoke manager B 420 uses unique data attribute B 438 to identify reference object 426, the message may include unique data attribute B 438. Spoke manager B 420 may receive the message in the first data format 474 (with unique data attribute B 438). In one embodiment, translator B 462 translates the message to a suitable format that may be used by application B 412 or application B database. In one embodiment, the message may be a series of messages/requests depending on the API of application B 412. Spoke manager B 420 may communicate directly with application B database if application B 412 does not allow a public API. Spoke manager B 420 translates the message, becomes aware that the message pertains to common data attributes of the reference object 426 (because of unique data attribute B 438).

The message includes all the common data attributes associated with the reference object 426. Spoke manager B 420 determines which common data attributes are applicable to the reference object used by application B 412. In other words, spoke manager B 420 may ignore some of the common data attributes in the message if they do not pertain to application B.

In some embodiments, a unique data attribute may be changed. For example, referring to the previous example, the human resource system may change the employee tax identification for an employee from "A52" to "B46". In this example, the "Employee_tax_id" is used by the spoke manager B 420 to uniquely identify the employee record. The hub manager 402 may generate a key change message if the unique data attribute used by another spoke manger is altered.

Figure 12:
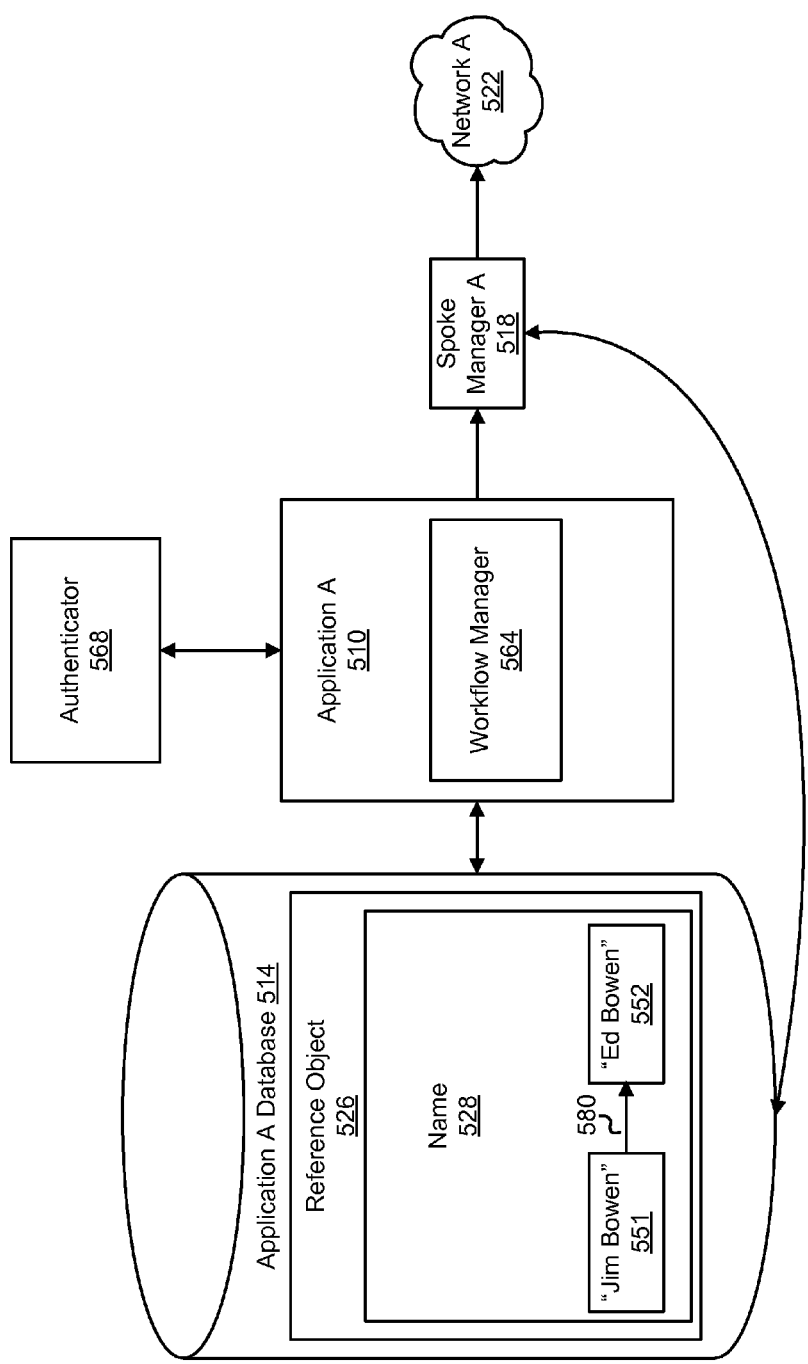
FIG. 12 is a block diagram illustrating one embodiment of a potential change in a common data attribute being authenticated.

FIG. 12 is a block diagram illustrating one embodiment of a potential change in a common data attribute being authenticated. Application A database 514 may include reference object 526 as previously explained. In one embodiment, the common data attribute of name 528 may be changed 580 from "Jim Bowen" 551 to "Ed Bowen" 552.

In one embodiment, application A 510 may access application A database 514 and store a queue record if changes to common data attributes have occurred. Application A 510, and the system including application A 510 (such as system A 106), may include native built-in workflow capabilities. In one embodiment, application A 510 may include a workflow manager 564 to manage these workflow capabilities. Spoke manager A 518 may monitor application A database 514 for a queue record. If a queue record is detected by spoke manager A 518, spoke manager A 518 may package a synchronization message that includes all of the common data attributes of the reference object 526 and sends the message to a hub manager. In a further embodiment, spoke manager A 518 may gather all the common data attributes of the reference object by making requests of application A 510 through an API or by accessing application A database 514 directly if there is no API available.

In one embodiment, a notification may be communicated to an authenticator 568 when a queue record is stored in application A database 514. The authenticator 568 may include a system administrator who may accept or reject the storage of the queue record. In another embodiment, the authenticator 568 may include computer software that automatically accepts or rejects the queue record according to certain parameters determined by the system administrator. For example, the system administrator may program the software to accept changes relating to the common data attribute of name 528 and reject changes the account number common data attribute 232. If the queue record is rejected, spoke manager A 518 does not build a message to send to a hub manager over network A 522.

Figure 13:
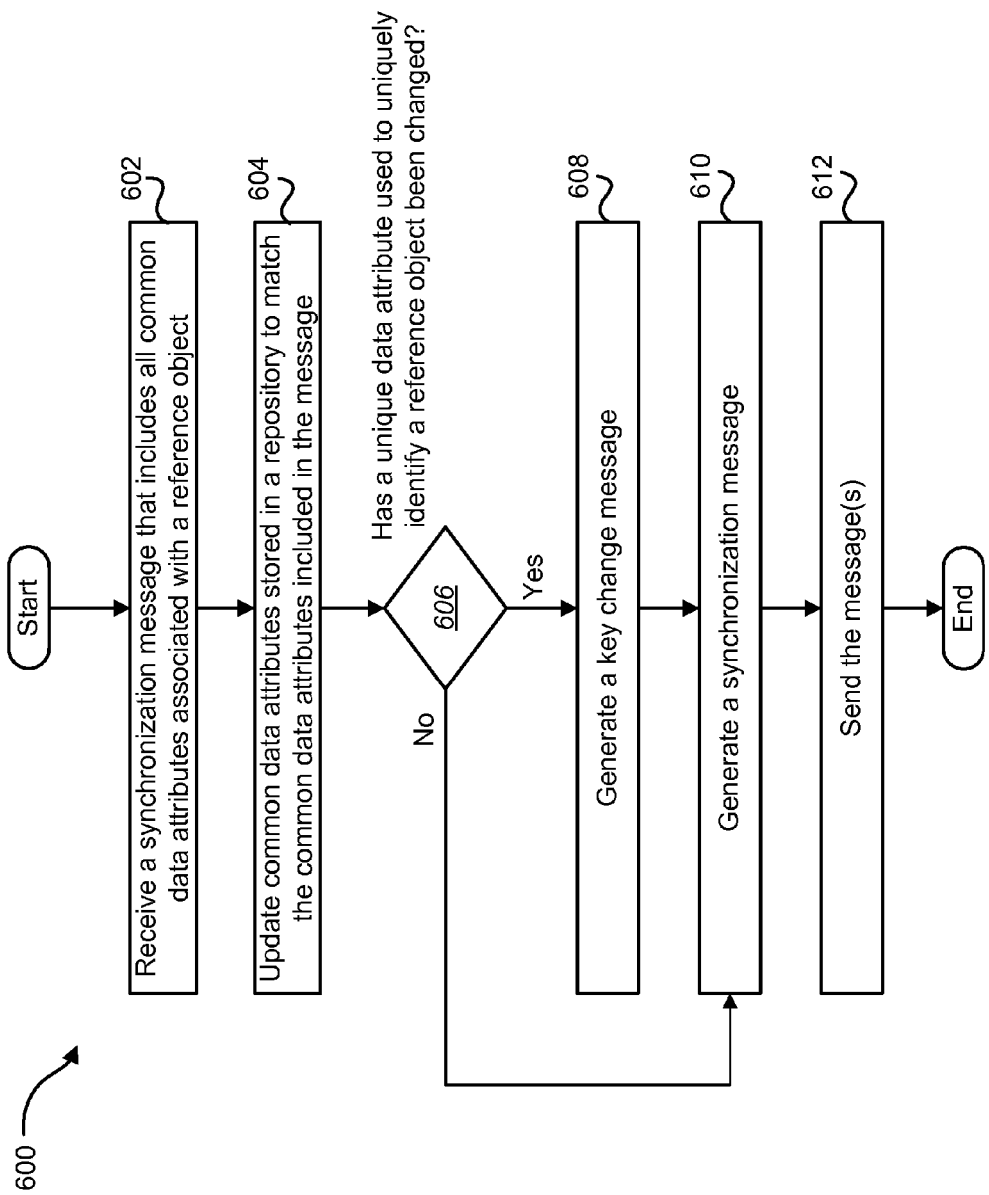
FIG. 13 is a flow diagram illustrating one embodiment of a method for notifying multiple systems and applications of changes to a common data attribute.

FIG. 13 is a flow diagram illustrating one embodiment of a method 600 for notifying multiple systems and applications of changes to common data attributes. In one embodiment, the method 600 may be implemented by the hub manager 102. A synchronization message that includes all common data attributes of a reference object may be received 602. In one embodiment, the data manager 456 receives 602 the message. Common data attributes that may be stored in a repository of the hub manager may be updated 604 to be in synchronization with the common data attributes included in the message. A determination 606 is made as to whether a unique data attribute used by a spoke manager to uniquely identify a reference object has been changed. If it is determined 606 that a unique data attribute is being updated, a key change message may be generated 608. In one embodiment, the key change message is queued up and addressed to the spoke manager(s) that use the unique data attribute to identify the reference object. If it is determined 606 that there is no unique data attribute being updated, a synchronization message may be generated 610. The synchronization message (and possibly the key change message) may be sent 612 to one or more spoke systems.

The message may include all the common data attributes associated with the reference object. The message may also include the unique data attribute used by the receiving spoke manager to uniquely identify the reference object. In one embodiment, the receiving spoke manager has sufficient contextual information to translate for differences in data structures, keys, application technologies and business rules. In a further embodiment, the receiving spoke manager may translate any differences and synchronize the data with its internal data structures.

Figure 14:
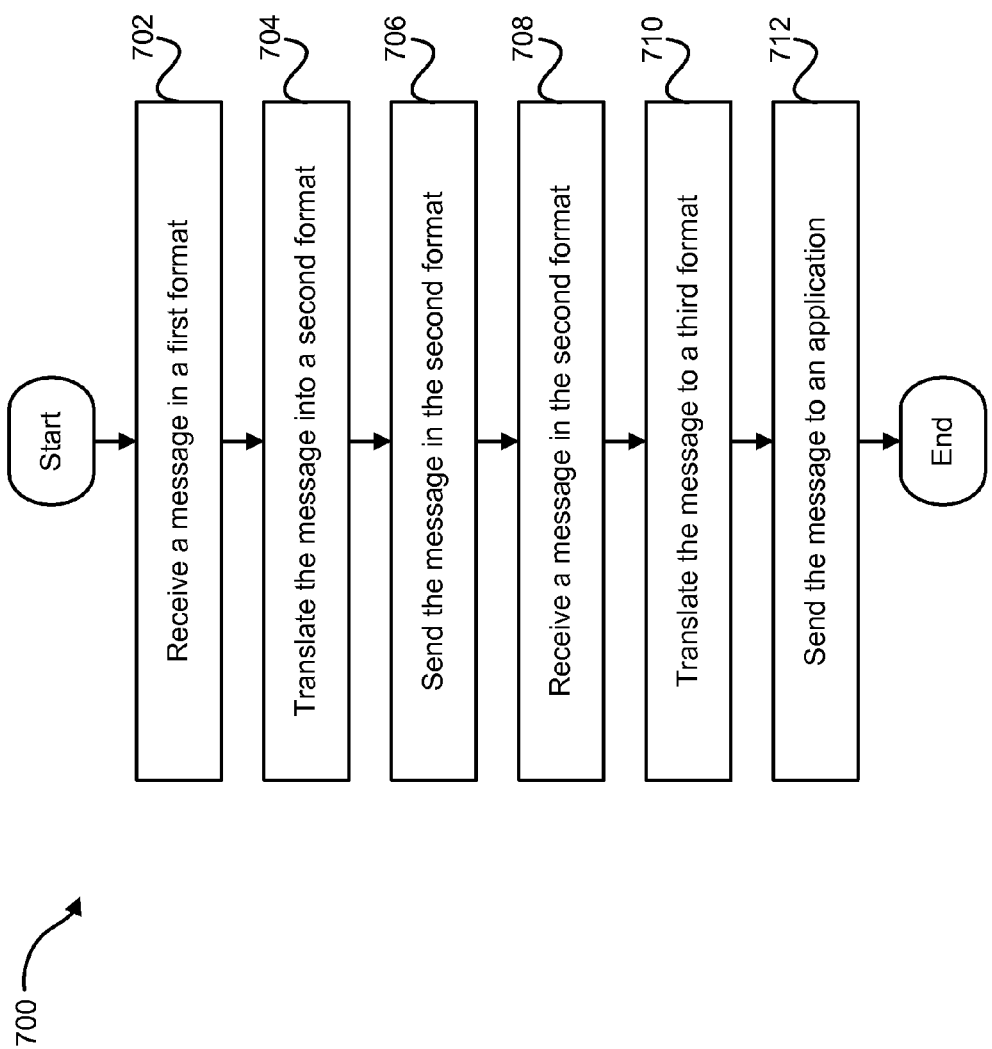
FIG. 14 is a flow diagram illustrating one embodiment of a method for translating a data packet into a specific data format.

FIG. 14 is a flow diagram illustrating one embodiment of a method 700 for translating a message into a specific format. In one embodiment, a spoke manager may implement the method 700. The message may be received 702 in a first format. In one embodiment, the first format may be a format specific to a particular system or application. The message may be translated 704 into a second format. In one embodiment, a translator included in the spoke manager may translate 704 the message into the second format. The message may be sent 706 in the second format. In one embodiment, the message may be sent to the hub manager 102 in the second format. The second format may include a format specific to the hub manager 102.

In one embodiment, a message may be received 708 in the second format. In one embodiment, the message may be received 708 from the hub manager 102. The message may be translated 710 to a third format. In one embodiment, the third format may be a format specific to a particular system and application. The message may be sent 712 to the system and application that is specific to the third format.

Figure 15:
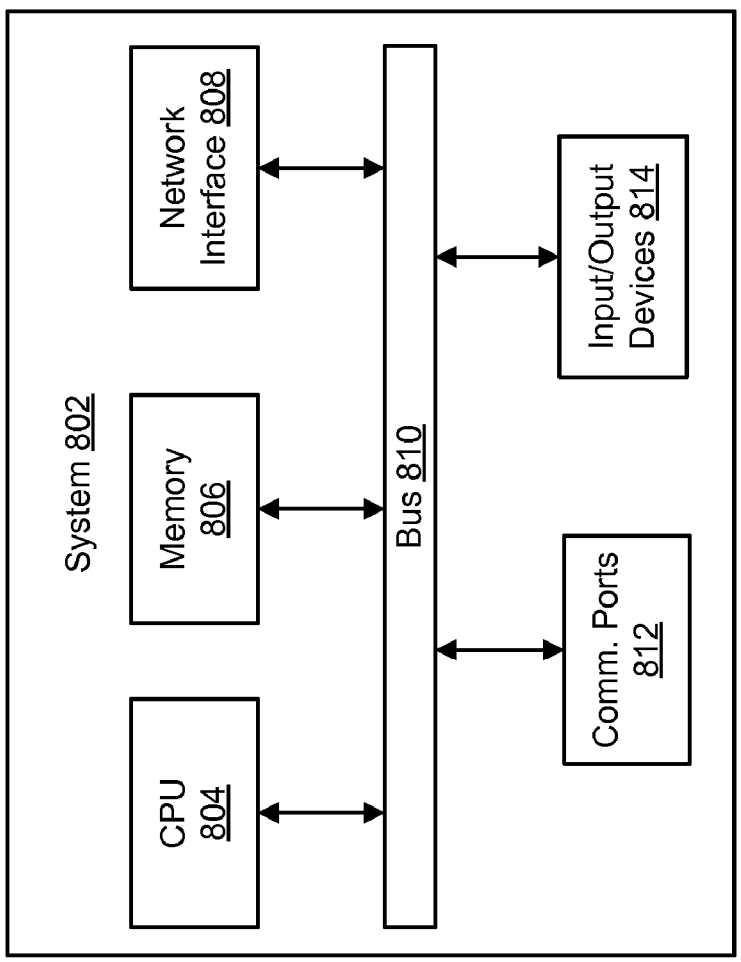
FIG. 15 is a block diagram of hardware components that may be used in an embedded device that is configured according to an embodiment.

FIG. 15 is a block diagram of hardware components that may be used in a system 802 that is configured according to an embodiment. A central processing unit (CPU) 804 or processor may be provided to control the operation of the system 802, including the other components thereof, which are coupled to the CPU 804 via a bus 810. The CPU 804 may be embodied as a microprocessor, microcontroller, digital signal processor or other device known in the art. The CPU 804 performs logical and arithmetic operations based on program code stored within the memory. In certain embodiments, the memory 806 may be on-board memory included with the CPU 804. For example, microcontrollers often include a certain amount of on-board memory.

The system 802 may also include a network interface 808. The network interface 808 facilitates communication between the system 802 and other devices connected to a network, which may be a pager network, a cellular network, a global communications network, the Internet, a computer network, a telephone network, etc. The network interface 808 operates according to standard protocols for the applicable network.

The system 802 may also include memory 806. The memory 806 may include random access memory (RAM) for storing temporary data. Alternatively, or in addition, the memory 806 may include read-only memory (ROM) for storing more permanent data, such as fixed code and configuration data. The memory 806 may also be embodied as a magnetic storage device, such as a hard disk drive. The memory 806 may be any type of electronic device capable of storing electronic information.

The system 802 may also include one or more communication ports 812, which facilitate communication with other devices. The system 802 may also include input/output devices 814, such as a keyboard, a mouse, a joystick, a touchscreen, a monitor, speakers, a printer, etc.

Of course, FIG. 15 illustrates only one possible configuration of a system 802. Various other architectures and components may be utilized.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array signal (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The methods disclosed herein comprise one or more steps or actions for achieving the described method. The method steps and/or actions may be interchanged with one another without departing from the scope of the present invention. In other words, unless a specific order of steps or actions is required for proper operation of the embodiment, the order and/or use of specific steps and/or actions may be modified without departing from the scope of the present invention.

While specific embodiments and applications of the present invention have been illustrated and described, it is to be understood that the invention is not limited to the precise configuration and components disclosed herein. Various modifications, changes, and variations which will be apparent to those skilled in the art may be made in the arrangement, operation, and details of the methods and systems of the present invention disclosed herein without departing from the spirit and scope of the invention.

What is claimed is:

1. A system for delegating authorization relating to an information technology resource, the system comprising:
   a processor;
   memory in electronic communication with the processor;
   a user database stored in the memory, wherein the user database includes a plurality of user identifications, wherein each user identification includes a trusted circle, and wherein the trusted circle comprises a plurality of trusted users, wherein each trusted user has a specific user authorization, wherein each trusted user in the trusted circle is individually selectable by an account owner and each specific user authorization is individually selectable by the account owner, whereby the account owner identified by a specific user identification selects the account owner's own trusted circle and selects the specific authorizations for trusted users in the account owner's own trusted circle, and wherein each account owner is only able to select the account owner's trusted circles and not other account owner's trusted circles; and
   instructions stored in the memory, the instructions being executable to:
      add a new trusted user to the trusted circle; and
      provide a user interface for the new trusted user wherein the new trusted user is capable of resetting a password for the account owner or of reinstating an account for the account owner, wherein the new trusted user and the account owner are not the same user, and wherein adding the new trusted user to the trusted circle does not allow the new trusted user to access the account or the password for the account owner.

2. The system of claim 1, wherein a plurality of the user identifications in the user database includes a plurality of trusted circles.

3. The system of claim 1, wherein each trusted user has the authorization to reset a password for the account owner.

4. The system of claim 1, wherein the new trusted user is capable of resetting a password for the account owner or of reinstating an account for the account owner by accessing a security email address via the new trusted user's own password.

5. The system of claim 1, wherein a first authorization allows the trusted user to reset the password and a second user authorization allows the trusted user to reinstate a suspended account, and wherein the account owner can designate which authorization is given to each trusted user in the trusted circle.

6. A method for delegating authorization relating to an information technology resource, the method comprising:
   adding a plurality of user identifications to a user database being stored on a computing device, wherein each user identification includes a trusted circle, and wherein the trusted circle comprises a plurality of trusted users, wherein each trusted user has a specific user authorization, wherein each trusted user in the trusted circle is individually selectable by an account owner, whereby the account owner identified by a specific user identification selects the account owner's own trusted circle and selects the specific authorizations for trusted users in the account owner's own trusted circle, and wherein each account owner is only able to select the account owner's trusted circles and not other account owner's trusted circles;

adding a new trusted user to the trusted circle;

providing a user interface for the new trusted user wherein the new trusted user is capable of resetting a password for the account owner or of reinstating an account for the account owner, wherein the new trusted user and the account owner are not the same user, and wherein adding the new trusted user to the trusted circle does not allow the new trusted user to access the account or the password for the account owner; and resetting the password for the account owner by the new trusted user.

7. The method of claim 6, wherein a plurality of the user identifications in the user database includes a plurality of trusted circles.

8. The method of claim 6, wherein each trusted user has the authorization to reset a password for the account owner.

* * * * *